United States Patent [19]

Micali

[11] Patent Number: 5,610,982
[45] Date of Patent: Mar. 11, 1997

[54] COMPACT CERTIFICATION WITH THRESHOLD SIGNATURES

[76] Inventor: Silvio Micali, 459 Chestnut Hill Ave., Brookline, Mass. 02146

[21] Appl. No.: 649,905

[22] Filed: May 15, 1996

[51] Int. Cl.$^6$ .............................. H04L 9/00; H04L 9/30
[52] U.S. Cl. ........................... 380/25; 380/21; 380/23; 380/29; 380/30; 380/49
[58] Field of Search .................... 380/9, 21, 23, 380/25, 29, 30, 49, 50

[56] References Cited

U.S. PATENT DOCUMENTS

| | | | |
|---|---|---|---|
| 4,326,098 | 4/1982 | Bouricius et al. | 380/25 |
| 4,926,480 | 5/1990 | Chaum | 380/23 |
| 5,097,504 | 3/1992 | Camion et al. | 380/23 |
| 5,214,702 | 5/1993 | Fischer | 380/30 |
| 5,261,002 | 11/1993 | Perlman et al. | 380/30 |
| 5,299,263 | 3/1994 | Beller et al. | 380/30 |
| 5,307,411 | 4/1994 | Anvret et al. | 380/25 |
| 5,420,927 | 5/1995 | Micali | 380/23 |

OTHER PUBLICATIONS

Gennaro, R. et al. "Robust Threshold DSS Signatures" *EuroCrypt 96* (9 pages), 1996.

Harn, L. "Group–oriented (t,n) threshold digital signature scheme and digital multisignature" *IEE Proc.–Comput. Digit. Tech.* vol. 141, No. 5, 307–313 (Sep. 1994).

"Public Key Infrastructure Study—Final Report" *National Institute of Standards and Technology* (Apr. 1994).

Kent, S. et al., IAB Privacy Task Force, Request for Comments No. 1114, "Privacy Enhancement for Internet Electronic Mail: Part II—Certificate–Based Key Management" 1–22 (Aug. 1989).

Micali, S., M.I.T. Technical Memo "A Secure and Efficient Digital Signature Algorithm" MIT/LCS/TM–501 *MIT Laboratory for Computer Science* 1–12 (Mar. 1994).

Rivest, R. L. et al., "A Method for Obtaining Digital Signatures and Public–Key Cryptosystems" *Communications of the ACM* vol. 21, No. 2, 120–126 (Feb. 1978).

Shamir, Adi "Identity–Based Cryptosystems and Signature Schemes" *Dept. of Applied Mathematics, The Weizmann Institute of Science* 47–53 (undated).

*Primary Examiner*—Bernarr E. Gregory
*Attorney, Agent, or Firm*—Foley, Hoag & Eliot LLP

[57] ABSTRACT

Certifying data includes having a subgroup of authorities each contribute a partial digital signature of the data to enable computation of a combined signature where the subgroup includes some, but not all, of the total number of authorities capable of applying a partial signature to the data, issuing a certificate for the data, and storing information in order to keep the subgroup of authorities accountable for the data that the subgroup of authorities contribute to eerily. In another scheme, certifying data can include having one or more lower-level authorities cause top-level authorities to receive an indication that the data is to be certified. A first subgroup of top-level authorities each applies a partial digital signature to the data. A certificate is issued containing a combined digital signature of a second subgroup of top-level authorities.

36 Claims, No Drawings

COMPACT CERTIFICATION WITH THRESHOLD SIGNATURES

TECHNICAL FIELD

This application relates to the field of compact data certification.

BACKGROUND OF THE INVENTION

In a digital signature scheme, a signer computes a pair of keys: a verification key and a matching signing key. The signer keeps this signing key secret and uses it in order to produce his digital signature (a string of bits) of a given message. The verification key is used by anyone who wishes to know whether a given string is the signer's digital signature of a message. Knowledge of the verification key alone is not, however, sufficient to produce correct signatures relative to the verification key. Thus, in order to enable as wide a distribution as possible for his own digital signature, the signer should make his verification key as public as possible. Therefore, verification keys are also referred to as "public keys" and signing keys are referred to as "secret keys".

Certification is a mechanism for proving that one or more characteristics of particular data are true. These characteristics may include the origin of the data and/or the identity of the originator of the dam. Particularly important are certificates that vouch that a given public key, $PK_i$, belongs to a user, U. Such certificates, in fact, enable the correct verification of the digital signatures of user U.

Data, D, can be certified by having a multiplicity of authorities indicate their approval using their own individual digital signatures, relative to their own :individual public keys, to sign D. These signatures (and public keys) may constitute a certificate for the data. Often, these signing authorities are organized hierarchically, in which case each authority, before contributing to certify the data, may also verify whether the lower-level authorities have sufficient authority to contribute to certification of the data.

While this system keeps the authorities who have caused the issuance of a certificate for D accountable, it is quite wasteful because the issued certificate contains individual signatures of all of the relevant authorities. In addition, the certificate may also include verification keys for each of the authorities whose verification key is not either known by the recipient of the certificate or is itself certified in another manner, either within the certificate or by means of a separate certificate. This can cause certificates to become quite long.

One way to decrease the size of the certificate is to have the authorities share a signature using a threshold digital signature scheme. In a (t,n) threshold digital signature scheme, a given group of n signers share a common public key CPK, but each individual member of the group, j, has a different secret key, $S_j$. By means of his own $S_j$, an individual signer, j, may produce his own partial signature (which cannot be forged by anyone else) for particular data, D. If t or more individual members correctly partially sign D, then their partial signatures can be easily combined so as to produce a digital signature of D that can be verified relative to CPK. On the other hand, the scheme is such that no set of less than t correct partial signatures of D can be combined to yield a correct signature of D relative to CPK. Thus, a correct signature of D relative to CPK proves that at least t of the n signers approved D. Such a single (combined) signature of D (relative to CPK) is typically more compact than t individual signatures of D. Several methods have been suggested for achieving such threshold signatures. See, for example, Ham, "Group-oriented (t,n) threshold digital signature scheme and digital multisignature", *IEE Proc.-Comput. Digit. Tech.* Vol. 141, No.5, 307–313 (Sept. 1994) and Gennaro et al., "Robust Threshold DSS Signatures", *EuroCrypt* 96.

While a (t,n) threshold signature of D vouches compactly for the fact that at least t out the n designated members approved D, it does not provide accountability of the at least t members who provided the necessary partial signatures of D. In fact, once the partial signatures of D are combined into a single signature of D relative to CPK, it cannot be determined which members approved D. The process of generating a signature of D relative to CPK is transparent to the verifier of the signature.

Because of the lack of accountability, producing a combined (t,n) threshold-signature of D relative to a given common key CPK (universally known or otherwise certified) is not in many instances a suitable method for certifying D. Without accountability, t out of the n certifying authorities could provide partial signatures for false data and then deny, with impunity, having caused the certification.

A (t,n) threshold signature scheme keeps all the signers accountable when n=t. If an (n,n) threshold signature of D relative to CPK has been produced, then all n authorities must have approved D, because all n authorities must have contributed their own partial signatures of D. Therefore, none of the individual signatories can deny having contributed to the certification. Unfortunately, however, in many cases an (n,n) threshold signature schemes is not adequate for certification purposes. A certification scheme may include many certification authorities of various types. A large organization could have one hundred or more certifying authorities. It could therefore be impractical to require all of them approve each item of data to be certified by partially signing it.

It is thus desirable to develop a practical way to produce compact certificates by means of threshold signatures in a way that maintains accountability of the authorities who cause a given certificate to be issued.

SUMMARY OF THE INVENTION

According to the present invention, certifying data includes having a subgroup of authorities each contribute a partial digital signature of the data to enable computation of a combined signature, where the subgroup includes some, but not all, of the total number of authorities capable of applying a partial signature to the data, issuing a certificate for the data, and storing information in order to keep the subgroup of authorities accountable for the data that the subgroup of authorities contribute to certify.

The certificate may be issued by a single other authority or by a plurality of authorities, in which case the certificate may be issued with a digital signature of the single authority or at least one of the plurality of authorities. The data that is certified may be a public key and may indicate that the public key belongs to a particular user. The public key may be chosen to be used in connection with a digital signature system or a public key encryption system. Some or all of the data may be included in the certificate which may be contributed or added to by an other authority that causes the certificate to be issued.

According further to the present invention, certifying data includes one or more lower-level authorities causing a plurality of top-level authorities to receive an indication that the data is to be certified, a first subgroup of top-level authorities each applying a partial digital signature to the data, and issuing a certificate containing a combined digital signature of a second subgroup of top-level authorities.

The information that is stored may be used to identify each member of the subgroup of authorities and may include a combined digital signature of all of the subgroup of authorities. The combined signature may be a (t,n) Harn-type signature or a fully-accountable subset signature. Part or all of the information that is stored may be stored in the certificate.

The second subgroup of top-level authorities may be identical to the first subgroup of top-level authorities. The second subgroup of top-level authorities may be a subset of the first subgroup of top-level authorities. The plurality of authorities that receive an indication may be identical to the first subgroup of top-level authorities. The combined digital signature may keep the second subgroup of top-level authorities accountable for the data that the top-level authorities cause to be certified.

DETAILED DESCRIPTION OF THE PREFERRED EMBODIMENTS

A user can request certification of data for a variety of reasons. The data may be a public key chosen by the user for use in connection with a public key encryption scheme. Alternatively, the data could be a public key used in connection with a digital signature scheme. One purpose of such a certification is to verify that a particular user is the owner of a particular public key. The verification can be performed by an authority having a public key that is either universally known or is itself certified.

Note that, in some instances, it is possible for a lower level authority to certify, digitally sign, or otherwise affirm data even though all or at least a portion of the data has not yet been determined. For example, a certificate may include the time of issuance of the certificate, in which case a lower authority can signify approval of some of the certificate data, such as a public key, even though the remainder of the data, such as the time of issuance, cannot be known by the lower level authority.

Multiple Public Key Fully-Accountable Subset Signature Scheme

The system disclosed herein envisions $A_1, A_2 \ldots$ possible certification authorities. It is not necessary to know a priori the set or the number of such possible authorities. Each $A_i$ has a public key $PK_i$, and a corresponding secret key $SK_i$. Preferably, each $A_i$ chooses his public key, and proves that he knows the corresponding secret key. Such proof can be stored in some manner (e.g., in a certificate for $PK_i$, or otherwise). The $PK_i$ and $SK_i$ keys can be, respectively, public and secret keys of an El Gamal signature scheme in the same range so that each (individual) public key may be a number between 1 and p-1, where p is a prime number, preferably 1,000-bits long.

In a (t,n) Harn threshold scheme, all the El Gamal public keys of a predetermined group of n signers are multiplied modulo p in order to obtain a common public key CPK for the group. In the system disclosed herein, however, it is not assumed that there is a predetermined group of authorities. Furthermore, in many cases it may not be practical to have a fixed group of authorities for issuing certificates. Instead, there are different subgroups of authorities that approve data.

It is desirable to make the approval of any one of these subgroups (including a subgroup consisting of the entire group of n signers) compact while keeping each of the members of the subgroup accountable.

A common verification key can be generated for each subgroup of signing authorities that sign particular data. For example, assume that a certificate for data, D, requires approval of authorities $A_{i1}, A_{i2}, \ldots, A_{ik}$, and that these authorities have signed D (each $A_{ij}$ with respect to his own individual verification key $PK_{ij}$). Then, another authority, A, may issue a certificate by directly signing D relative to his own public key $PK_A$ (which is either universally known or otherwise certified). A may also add additional information to the certificate. In order to keep the subgroup of authorities $A_{i1}, \ldots, A_{ik}$ accountable for the certificate they caused to issue, the authority A (or another entity) can store or cause to have stored the combination of the individual signatures, $S_{(i1, \ldots, ik)}$, of the subgroup of authorities together with an indication of the identity of individual members of the subgroup of authorities, $A_{i1}, \ldots, A_{ik}$, whose partial signatures were used in the computation of $S_{(i1, \ldots, ik)}$.

Storing the information set forth above can be preferable to storing the k partial digital signatures of $A_{i1}, \ldots, A_{ik}$. In fact, the single combined signature $S_{(i1, \ldots, ik)}$ can be the same length as one of the partial signatures (all being, in an exemplary embodiment, El Gamal signatures modulo p). The identities of the subgroup of authorities can be stored in a compact encoded form. For instance, if the set of all possible authorities comprises 100 individuals, then each authority can be identified by means of seven bits. In that case, k partial signatures can be replaced by one combined signature and seven times k bits of identification. This can be quite advantageous, because each partial signature could consist of hundreds of bits rather than seven bits.

While allowing for very compact storage, the system described herein nonetheless keeps all relevant authorities accountable. Given the identities of the subgroup of authorities that contribute to certification, one can easily retrieve the corresponding public keys $PK_{i1}, \ldots, PK_{ik}$, multiply the keys modulo p to obtain $PK_{(i1, \ldots, ik)}$, and verify that $S_{(i1, \ldots, ik)}$ is a valid signature relative to $PK_{(i1, \ldots, ik)}$. Thus, a description of the subgroup composed by $A_{i1}, \ldots, A_{ik}$ and the combined signature $S_{(Ai1, \ldots, Aik)}$ constitute sufficient accountability information In addition, it is not necessary to individually list all of the authorities who approved D and whose partial signatures were actually utilized in generating $S_{(i1, \ldots, ik)}$. Other techniques used to specify this subgroup of authorities would be sufficient. For example, in a certification infrastructure in which the certification authorities could be organized in a tree-like fashion, there could be 100 first-level authorities, 10 second-level authorities, and a single third-level authority. Each second-level authority could supervise 10 first-level authorities, and each first-level authority could respond to a single second-level authority. The third-level authority supervises the second-level authorities. In such an arrangement, data, D, is certified by being approved by a proper first-level authority and by all the superiors thereof. Thus, because the tree-structure is known a priori, each subgroup of authorities relevant for certification consists of three authorities that can be known by specifying just the first-level authority. The issued certificate may consist of the combined signature along with the identity or code-name for only the relevant first-level authority (e.g., seven bits altogether plus the combined signature of the three authorities). In addition, note that even if the tree structure is not so rigid (e.g., a certification authority having more than one superior), the number of legitimate subgroups could still be much smaller than the set of all possible subgroups. Therefore, it is possible to create compact descriptions of the possible subgroups that do not require specifying each individual member.

In addition, if the number of all possible subgroups of authorities is not too great, it is possible to dispense altogether with storing the identities of the members of the subgroup. In that case, the particular subgroup that caused a certificate to issue may be ascertained by determining the products of the public keys of all possible subgroups of authorities, until one is found for which $S_{(i1, \ldots, ik)}$ is a valid signature. In the tree-like structure example given above, products for only 100 subgroups, the ones corresponding to each of the first-level authorities (and their superiors), need to be calculated. Not storing the specific identities of the authorities will decrease the total amount of storage space needed for a certificate. Of course, this technique will require extra time to determine the identities of the authorities if confirmation of the identities of the authorities is desired. However, in most circumstances, the identities of the authorities will not be needed. For example, the identities may only be needed when a piece of data has been improperly or inappropriately certified by a subgroup of authorities. On the other hand, not storing the identifies of the authorities provides continuous savings of storage space for every certificate that is issued.

It is also possible to provide a milder form of accountability by storing only the identifying information for the group of authorities that authorized a certificate. The combined signature of the authorities is not stored. However, such a system does not provide a way to prevent an authority from later denying having certified data since it does not provide a mechanism to irrefutably prove that any particular authority contributed to certification.

Accountability information can be stored as part of, or within, a certificate. For instance, authority A can digitally sign (D, I, $S_{(i1, \ldots, ik)}$) to provide a certificate where I specifies the identities of the relevant subgroup of authorities, $A_{ij}$'s. The certificate can include additional information, such as time information. Alternatively, A may sign and include within the certificate the combined public key, $PK_{(i1, \ldots, ik)}$, of the authorities $A_{i1, \ldots, Aik}$, as well as the combined signature of the authorities relative to the combined public key. Such approaches make a certificate "accountability-autonomous," in that the certificate, by itself, includes sufficient information to provide accountability. Alternatively, accountability information can be stored both within and outside a certificate. Another option is to store a portion of the accountability information within the certificate and a portion of the information outside the certificate.

It is desirable to ensure that the system can be protected against a malicious entity, A', who tries to take advantage of the fact that there are many subgroups of authorities and attempts to find a subgroup corresponding to a common public key that allows A' to produce a forged signature of D relative to that public key. In the system described herein, A' probably will not be able to generate from scratch a new public-secret key pair (PK,SK), and then find a subgroup of authorities whose individual public keys combine to yield PK. This is especially true if the total number of subgroups is relatively small, either because the total number of possible authorities is small, or because, like in the tree-structure example set forth above, only certain subgroups are legitimate subgroups, and the total number of legitimate subgroups is small. However, even assuming for the sake of argument that A' could create a combined signature of data for some subgroup without first obtaining the partial signature of that subgroup relative to that data, special steps can be taken to make it difficult for A' to improperly use such a self-generated public-secret key pair. These steps may include registering proofs of knowledge of the corresponding secret key for each individual public key or having the subgroup of authorities sign D and sign a description identifying the subgroup.

In the scheme discussed above, we assume that the individual verification keys of the authorities, $A_i$'s, are known to some authority A, though possibly not known to certificate verifiers-at-large (i.e., the possible recipients/users of the certificate). If the individual public keys of the authorities are instead known or obtainable by certificate verifiers, there are opportunities to provide additional features to the system described herein. For instance, assume that each of the authorities $A_i$ has an individual public key $PK_i$ that is publicly known (or obtainable in some certified manner); and assume that a proper subgroup of the authorities $A_{i1}, \ldots, A_{ik}$, approve a piece of data D and enable computation of $A_{(i1, \ldots, ik)}$, the digital signature of D relative to the combined public key of the subgroup, $PK_{(i1, \ldots, ik)}$. Then, there is no need for some other authority A to digitally sign D (while keeping the subgroup accountable) in order to issue a valid certificate. Indeed, $S_{(i1, \ldots, ik)}$ and an indication of the composition of the subgroup constitutes a sufficient certificate. In order to verify the subgroup's signature of D, one could use the indication of the subgroup to reconstruct the identities of the authorities in it; retrieve their public keys; combine them so as to obtain $PK_{(i1, \ldots, ik)}$, and then check whether $S_{(i1, \ldots, ik)}$ is a valid signature of D relative to $PK_{(i1, \ldots, ik)}$. On the other hand, it should be hard for a malicious entity A' to certify a piece of data on behalf of a proper subgroup of authorities without the collaboration of all authorities in this subgroup. If the number of authorities is small, or if the proper subgroups are sufficiently few, the indication of the subgroup composition can be omitted.

The system described herein can be deemed a multiple public key fully-accountable subset signature scheme, which is a more general form and use of threshold signatures and is the subject of a copending U.S. patent application Ser. No. 08/648,344, filed May 15, 1996 filed by the inventor of the present application and titled "COMPACT DIGITAL SIGNATURES". In a preferred embodiment of the multiple public key fully-accountable subset signature scheme, a multiplicity of signers each has their own public key and corresponding secret key. These individual public keys are combinable (e.g., in a manner similar to that described in Harn). Thus, the public keys of any subset of these signers, $A_{i1}, \ldots, A_{ik}$, can be easily combined to obtain a subset public key, $PK_{(i1, \ldots, ik)}$, and the signers in the subset can enable the computation of the signature of a piece of data D relative to $PK_{(i1, \ldots, ik)}$. This computation is hard to compute without collaboration of these signers. Preferably, each signer in the subgroup collaborates to the computation of this subset signature by computing the signature of D relative to his own public key. To facilitate verification, such a signature can be enriched with a description of the subset of signers. All a verifier has to do is to retrieve the proper public keys, combine them, and check whether the combined signature is valid relative to this key. Such subset signatures are quite compact, and yet provide accountability for all signers in the subset.

Although the system described herein can be implemented based on schemes such as the one described in Harn, the system contains features not found in Harn, such as the ability to keep all signers accountable. In addition, the multiple public key subset signature scheme described herein can obtain a signature relative to any subset of signers, and not just those subsets with at least t members, such as in the scheme described in Harn. However, if desired, it is possible to bar certain subsets from being valid signer subsets in the system. Also, there is an advantageous difference of perspective between Harn and the system described herein since the subset signature scheme described herein does not envisage a predetermined group of signers. Indeed, a recipient may happen to know only some of the possible signers, and still be able to verify the signatures for the subsets of the signers that are known, provided that the recipient knows or obtains their public keys. By contrast, in the Harn scheme, one verifies a (t,n) threshold signature only with respect to a single public key that corresponds to the combination of all n public keys.

In addition, if there are n predetermined signers, and one recognizes as valid only subsets with t (or more) signers, then the subset signature scheme described herein resembles the (t,n) threshold signature scheme described in Harn, but has the additional feature of full accountability, which is not found in Harn.

The subset signature scheme described herein may yield a convenient and compact way to keep track (with accountability) of some signers (not necessarily all who have approved the same data D, even though these signers may sign D individually, without knowing in advance the subset signature to which their own individual signature contributes.

Alternatively, individual signatures may be combined into a subset signature only with the explicit consent of all members in the subset. For instance, each signer in a subset I contributes to I's subset signature of data D by individually signing enriched data (I,D). All these individual signatures may thus be combined into I's signature of (I,D). However, a combined signature of (I,D) relative to the combined public key of a subset J other than I is not deemed to be J's approval of D. Of course, different methods to achieve similar results may be adopted.

Alternatively yet, subset signatures may be recognized for some groups of signers, G, but not for other groups, H. For instance, to indicate such a group G, a proper certificate for G, C(G), is issued (e.g., some authority's signature for a suitable description of G, or for the sequence of the public keys of the members of G). Similarly, "negative" certificates for the groups H may be issued.

Single Public Key Fully Accountable Subset Signature Scheme

The multiple public key fully-accountable subset signature scheme envisage that there is a multiplicity of signers, each with his own independent public-secret key pair, and one or more verifiers who can access these individual public keys. It is not necessary to know a priori how many signers there are.

An other signature scheme, deemed a single public key fully-accountable subset signature scheme, is the subject of a copending U.S. patent application Ser. No. 08/648,344 filed May 15, 1996 filed by the inventor of the present application and titled "COMPACT DIGITAL SIGNATURES". In that scheme, a multiplicity of n signers share a single common public key, CPK, while each signer i possesses an individual secret signing key $SK_i$. (Several scenarios for selecting/assigning the keys are possible. For instance, an entity consisting of a machine, a person, or collections of people and/or machines may select CPK and all of the individual secret keys and then assign the secret keys to each signer. Alternatively, the signers may choose CPK and their own individual secret signing keys by themselves; For instance, by running a multiparty secure computation protocol. Alternatively yet, the signers and an external entity may collaborate in selecting CPK and the individual secret signing keys. Preferably, each signer will only know his own secret signing key.) CPK and the $SK_i$'s are such that, using their own individual secret keys, the signers of any subset of signers, $I=(A_{i1},\ldots,A_{ik})$, can enable the computation of the digital signature of a message M relative to CPK, where such a signature keeps all members of I accountable. The single public key fully-accountable subset-signature scheme is superior to (t,n) threshold schemes. The single public key fully-accountable subset-signature scheme offers full accountability, and also may generate signature for any type of subset of the n signers, and not just those subsets consisting of at least t signers. This extra flexibility may be very useful, for instance, if M is an order, and the n signers are military officers—comprising a commander in chief, generals, colonels, etc.—it may be agreed that the order be carried out if signed by a group of at least t colonels, or by just two generals, or by the single commander in chief. Increased flexibility has also proved crucial in the prior art in other domains of cryptography such as secret sharing or verifiable secret sharing, where each of a number of trustees has a piece of a secret value, and it is desired that the secret value can be reconstructed with the help of arbitrary specified sets of trustees, and not just those containing a majority of trustees.

There are many ways in which a single public key fully-accountable subset signature scheme can be practically implemented. For convenience, but without limitation intended, the following shows such a practical implementation by suitably transforming the multiple public key fully-accountable subset signature scheme described herein.

Let each signer i of the n signers have a verification key $PK_i$, and a corresponding secret key $SK_i$, where again these verification keys are combinable. Then, let CPK consist of the sequence of these public keys, $CPK=(PK_1,\ldots,PK_n)$, and let each signer i hold $SK_i$ as his own secret key relative to CPK. Then, in order to obtain the subset signature of a message M relative to CPK and a subset of signers $I=(A_{i1},\ldots,A_{ik})$, each signer i in I generates a signature of M, $SIG_i(M)$, relative to verification key $PK_i$. Then, from these $SIG_i(M)$'s a combined signature $S_{(i1,\ldots,ik)}$ of M relative to the combined public key $PK_{(i1,\ldots,ik)}$ is obtained. Subset I's signature of M relative to CPK then consists of $S_{(i1,\ldots,ik)}$ and preferably a description of I (to facilitate verification). To verify such a subset signature, using CPK and I, one obtains the verification keys of the members of I, $PK_{i1},\ldots,PK_{ik}$. Then, from these verification keys one computes a combined verification key $PK_{(i1,\ldots,ik)}$ (i.e., the single public key), and checks whether $S_{(i1,\ldots,ik)}$ is a valid signature relative to $PK_{(i1,\ldots,ik)}$. Such a subset signature of M keeps all members of I accountable, and is hard to forge by an impostor A' who does not have the collaboration of all members of I.

A subset I's signature of M relative to CPK may not need to include I for the subset signature to keep I's members accountable. For instance, in the above-exemplified embodiment, if the number of all possible subsets I is deemed sufficiently small, one may cycle through all of the possible I's until one $I=(A_{i1},\ldots,A_{ik})$ is found so that $S_{(i1,\ldots,ik)}$ is a genuine signature relative to the combined verification key $PK_{(i1,\ldots,ik)}$.

The subset signature scheme described herein may yield a convenient and compact way to keep track (with accountability) of some signers (not necessarily all) who have approved the same data D relative to some public key CPK, even though these signers may partially sign D individually relative to the same CPK but each using his own CPK, without knowing in advance the subset signature to which their own partial signature contributes.

Alternatively, partial signatures may be combined into a subset signature relative to some CPK only with the explicit consent of all members in the subset. For instance, each signer in a subset I contributes to I's subset signature of data D by individually signing enriched data (I,D). All these individual signatures may thus be combined into I's signature of (I,D). However, a combined signature of (I,D) relative to the combined public key of a subset J other than I is not deemed to be J's approval of D. Of course, different methods to achieve similar results may be adopted.

Alternatively yet, subset signatures may be recognized for some groups of signers, G, but not for other groups, H. For instance, to indicate such a group G, a proper certificate for G, C(G), is issued (e.g., some authority's signature for a suitable description of G, or for the sequence of the public keys of the members of G). Similarly, "negative" certificates for the groups H may be issued.

Additional Compact Certification Schemes Via Threshold Signatures

Threshold signatures and fully-accountable subset signatures (possibly based on individual public keys in a multiple key or single key system) can be used in another way to provide certification with accountability. Assume a certification system includes a number of top-level authorities and another number of other authorities (possibly with some overlaps). Note that for purposes of this discussion, top-level means the highest level within a particular system or subset of the system, even though authorities deemed "top-level" may be at a lower-level if the particular system is embedded into a larger one.

If each authority in a proper subgroup of authorities individually acts to cause data, D, to be certified, then the top-level authorities contribute to the production of a threshold or subset signature of D relative to their own common public key T-LCPK or set of public keys (preferably by means of a (n,n) type threshold system, if there are n top-level authorities or a subset signature that keeps all top-level authorities accountable), and store (within this certificate, outside it, or both inside and outside it) an indication, I, of the identifies of the subgroup of the other authorities who have individually signed D. Irrespective of whether the individual signatures (or combined, threshold, or subset signatures) of the authorities in subgroup I are stored, the steps discussed above keep the members of I accountable for the certificates they cause to issue. In fact, the (n,n) threshold signature of the top-level authorities guarantees that each of the top-level authority has verified that a correct individual approval of D existed for each of the members of I. Thus, even though one top-level authority could falsely testify to this effect, the chance that all (i.e., n out of n) top-level authorities might do so can be made small. For example, the top-level authorities could be chosen to minimize the likelihood of dishonesty and/or collusion among such authorities.

Note that the subgroup of top-level authorities that receives an indication from the lower level authorities that the data is to be certified does not necessarily have to be the same group or subgroup of top-level authorities that apply a partial digital signature to the data. (For instance, a proper group of lower level authorities may provide an indication to all top-level authorities, but only some of the top-level authorities may, as a result, produce a partial digital signature.) In addition, the combined digital signature that is used to issue the certificate can be different from the combined digital signature that results when the subgroup of authorities applies partial digital signatures to the data. (For instance, all top-level authorities may produce their own partial digital signatures for the data, but only some of these partial digital signatures are used to produce the combined signature certificate.)

The system described above is thus of a "witness" type system. By virtue of their combined signatures, all top level authorities testify that each authority within a group I has properly signed a piece of data, D. The use of (n,n) threshold signatures for the top-level authorities makes this witnessing much more compact than all the individual signatures of the other authorities, or the individual signatures of all top-level authorities. Thus, even though issuing a certificate for D requires the approval of several (other) authorities, only a single signature can be present in the certificate if desired. Of course, it is possible to have additional signatures in the certificates. Also, the description of the subgroup, I, can often be omitted or simplified under certain circumstance such as, for instance, if only one subgroup of authorities is authorized to cause the issuance of a certificate for D.

Of course, in order to produce a (n,n) threshold signature or a subset signature that keeps all top-level authorities accountable, all top-level authorities must produce a partial signature for each certificate. This does not mean, however, that the system is impractical. In fact, even assuming that a piece of data needs to undergo complex verification (e.g., to certify that a given public key belongs to a given user, the user may need to be identified in person), these complex verifications will typically be performed by other authorities (and there can be very many of them). The top-level authorities may thus just witness the correctness of the signatures of a given subgroup of proper authorities. If desired, however, the top-level authorities may also perform additional verifications, such as checking that the subgroup of other authorities is entitled to vouch for the certification of D, or for a given type of certification of D.

It is possible for the top-level authorities to alternatively use a (t,n) threshold signature scheme. However, in that case, one or more of the top-level authorities could disclaim certification. However, for data that is falsely certified, t out of n top-level authorities would have to lie. Alternative yet, the top-level authorities may use a subset signature scheme so as to keep accountable some, but not all, top-level authorities. Note that the other authorities at other levels in the chain of authority may also use threshold signatures (e.g., (k,k)) or subset signatures rather than individual signatures and that toplevel authorities may be intermediate authorities to other higher-level authorities.

It should be appreciated that the system described herein does not apply only to certification, but instead, can be used whenever there is a desire to compactly store the individual signatures of data by a subgroup of individuals (not necessarily the largest such subgroup), in a way that keeps those individuals accountable.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method of certifying data, comprising the steps of:
   (a) a subgroup of authorities each contributing a partial digital signature of the data, the partial digital signature being a component used to compute a combined signature, wherein the subgroup includes some, but not all, of the authorities configured to apply a partial signature to the data;
   (b) issuing a certificate for the data if the combined signature is valid; and
   (c) storing accountability information that renders the subgroup of authorities accountable for the data that the subgroup of authorities contribute to certify.

2. A method of certifying data, according to claim 1, wherein the certificate is issued by a single other authority.

3. A method of certifying data, according to claim 2, wherein the certificate is issued with a digital signature of the other authority.

4. A method of certifying data, according to claim 2, wherein the other authority contributes additional data that is included in the certificate.

5. A method of certifying data, according to claim 1, wherein the certificate is issued by a plurality of other authorities.

6. A method of certifying data, according to claim 5, wherein the certificate is issued with digital signatures of the plurality of other authorities.

7. A method of certifying data, according to claim 5, wherein at leas one of the other authorities contributes additional data that is included in the certificate.

8. A method of certifying data, according to claim 1, wherein the data that is certified is a public key.

9. A method of certifying data, according to claim 8, wherein the data indicates that the public key belongs to a particular user.

10. A method of certifying data, according to claim 8, wherein the public key is chosen to be used in connection with at least one of: a digital signature system and a public key encryption system.

11. A method of certifying data, according to claim 1, wherein the data is included in the certificate.

12. A method of certifying data, according to claim 1, wherein the accountability information can be used to identify each member of the subgroup of authorities.

13. A method of certifying data, according to claim 12, wherein the accountability information includes a combined digital signature of all of the subgroup of authorities.

14. A method of certifying data, according to claim 1, wherein the combined signature is a multiple public key fully-accountable subset signature.

15. A method of certifying data, according to claim 1, wherein the combined signature is a single public key fully-accountable subset signature.

16. A method of certifying data, according to claim 1, wherein at least a portion of the accountability information is stored in the certificate.

17. A method of certifying data, according to claim 16, wherein all of the information is stored in the certificate.

18. A method of certifying data, comprising the steps of:
   (a) one or more of a first group of authorities causing a plurality of a second group of authorities to receive an indication that the data is to be certified;
   (b) a first subgroup of the second group of authorities each applying a partial digital signature to the data; and
   (c) issuing a certificate containing a combined digital signature of a second subgroup of the second group of authorities in response to the partial digital signatures of the first subgroup being valid.

19. A method of certifying data, according to claim 18, wherein the combined digital signature is a (t,n) threshold signature.

20. A method of certifying data, according to claim 19, wherein the second subgroup of authorities is identical to the first subgroup of authorities.

21. A method of certifying data, according to claim 19, wherein the second subgroup of authorities is a subset of the first subgroup of authorities.

22. A method of certifying data, according to claim 19, wherein the plurality of authorities that receive an indication is identical to the first subgroup of authorities.

23. A method of certifying data, according to claim 18, wherein the combined digital signature is a multiple public key fully-accountable subset signature.

24. A method of certifying data, according to claim 23, wherein the second subgroup of authorities is identical to the first subgroup of authorities.

25. A method of certifying data, according to claim 23, wherein the second subgroup of authorities is a subset of the first subgroup of authorities.

26. A method of certifying data, according to claim 23, wherein the plurality of authorities that receive an indication is identical to the first subgroup of authorities.

27. A method of certifying data, according to claim 18, wherein the combined digital signature is a single public key fully-accountable subset signature.

28. A method of certifying data, according to claim 27, wherein second subgroup of authorities is identical to the first subgroup of authorities.

29. A method of certifying data, according to claim 27, wherein the second subgroup of authorities is a subset of the first subgroup of authorities.

30. A method of certifying data, according to claim 27, wherein the plurality of authorities that receive an indication is identical to the first subgroup of authorities.

31. A method of certifying data, according to claim 18, wherein the combined digital signature keeps the second subgroup of authorities accountable for the data that the second group of authorities cause to be certified.

32. A method of certifying data, according to claim 18, wherein the data that is certified is a public key.

33. A method of certifying data, according to claim 32, wherein the data indicates that the public key belongs to a particular user.

34. A method of certifying data, according to claim 32, wherein the public key is chosen to be used in connection with at least one of: a digital signature system and a public key encryption system.

35. A method of certifying data, according to claim 18, wherein the data is included in the certificate.

36. A method of certifying data, according to claim 35, wherein at least one of the second group of authorities contributes additional data that is included in the certificate.

* * * * *